United States Patent
Huddle

(10) Patent No.: US 7,409,905 B2
(45) Date of Patent: Aug. 12, 2008

(54) CROP PROCESSING MACHINE

(75) Inventor: Jay O. Huddle, Napoleon, OH (US)

(73) Assignee: A. Duda & Sons, Inc., Oviedo, FL (US)

( * ) Notice: Subject to any disclaimer, the term of this patent is extended or adjusted under 35 U.S.C. 154(b) by 387 days.

(21) Appl. No.: 10/840,966

(22) Filed: May 7, 2004

(65) Prior Publication Data

US 2005/0247214 A1 Nov. 10, 2005

(51) Int. Cl.
*A23N 15/08* (2006.01)

(52) U.S. Cl. ............... 99/636; 99/546; 99/643

(58) Field of Classification Search ............ 99/636, 99/643, 635, 637, 642, 546
See application file for complete search history.

(56) References Cited

U.S. PATENT DOCUMENTS

| | | | | |
|---|---|---|---|---|
| 2,096,588 | A | | 10/1937 | King |
| 2,628,621 | A | | 2/1953 | Murdoch |
| 3,126,930 | A | * | 3/1964 | Vosti et al. ............ 99/491 |
| 3,734,004 | A | | 5/1973 | Losito |
| 4,094,238 | A | | 6/1978 | Striplin |
| 4,197,792 | A | * | 4/1980 | Mendoza ............ 99/349 |
| 4,198,903 | A | | 4/1980 | Turatti |
| 4,202,261 | A | | 5/1980 | Lawson |
| 4,361,084 | A | * | 11/1982 | Raatz ............ 99/516 |
| 4,455,929 | A | | 6/1984 | Goudarzi et al. |
| 4,777,055 | A | | 10/1988 | Laiw |
| 5,000,087 | A | * | 3/1991 | Nagaoka ............ 99/636 |
| 5,421,250 | A | * | 6/1995 | Beaumont ............ 99/636 |
| 5,495,797 | A | * | 3/1996 | Meulnart ............ 99/637 |
| 5,750,171 | A | | 5/1998 | Shuknecht |
| RE37,008 | E | * | 1/2001 | Sanchez et al. ............ 426/496 |
| 6,237,477 | B1 | * | 5/2001 | Huddle ............ 99/636 |

* cited by examiner

*Primary Examiner*—Reginald L Alexander
(74) *Attorney, Agent, or Firm*—Ladas & Parry LLP

(57) ABSTRACT

A crop processing machine includes a transport mechanism for conveying a crop, a mounting assembly fixed with respect to the transport mechanism, and a knife assembly pivotally mounted with a 4-bar link to the mounting assembly, the knife assembly including a knife for trimming the crop as the crop is conveyed past the knife assembly.

19 Claims, 9 Drawing Sheets

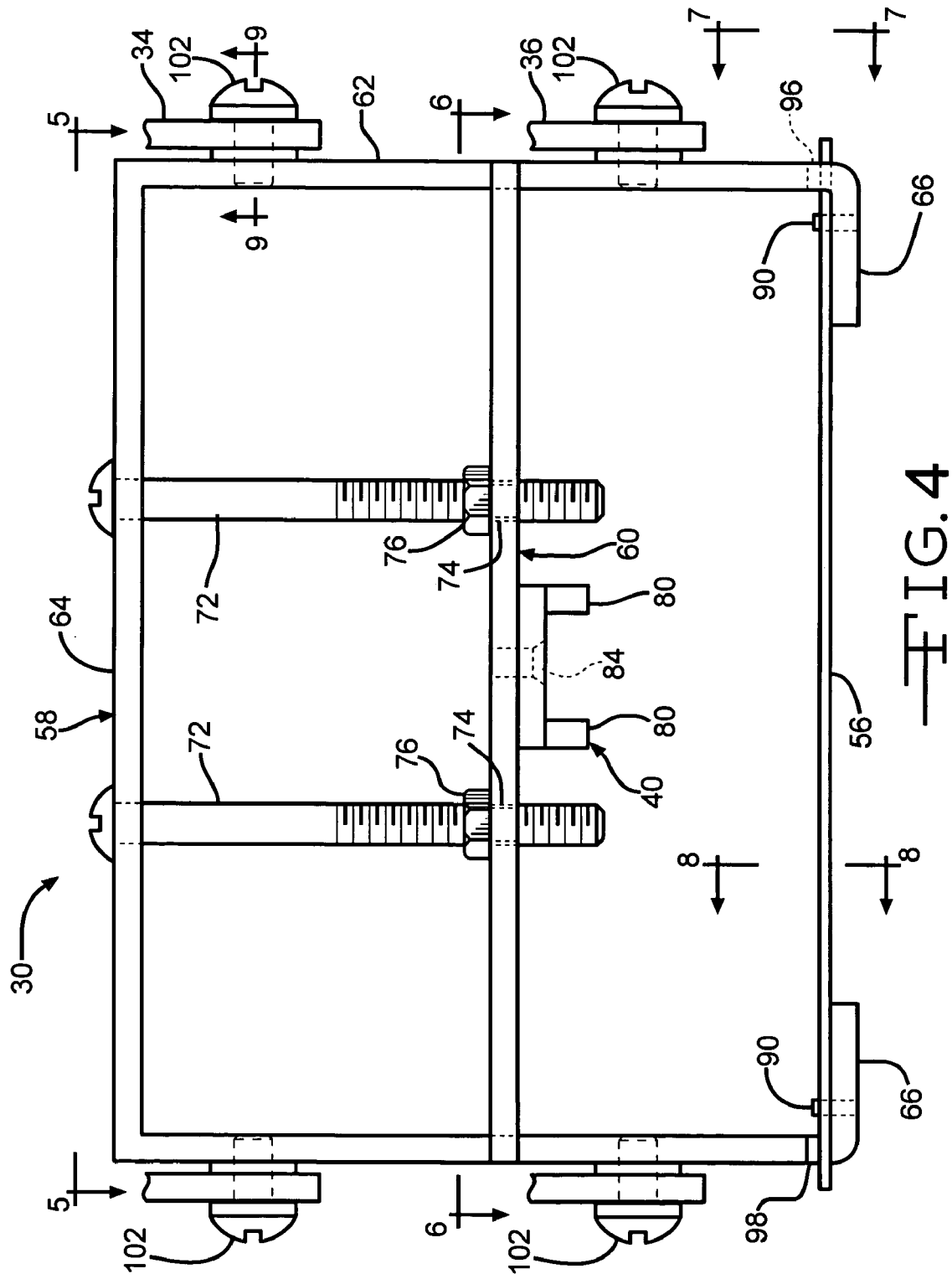

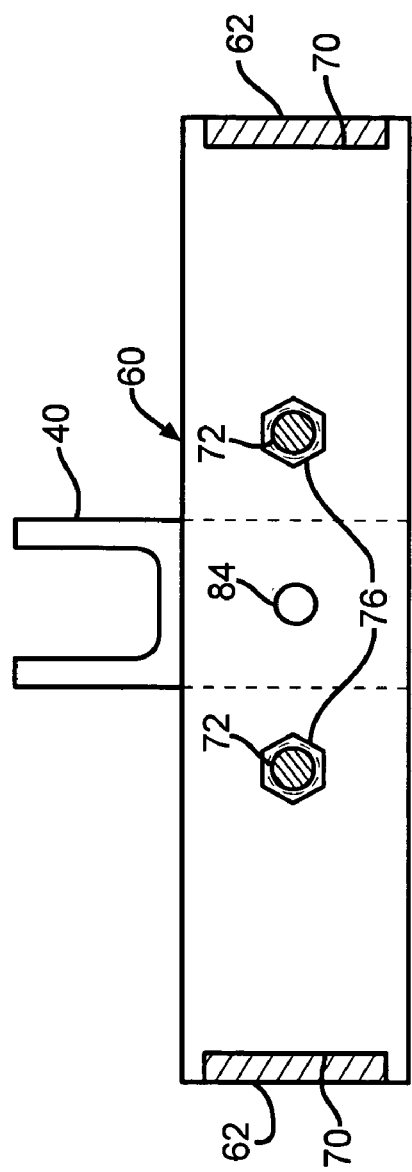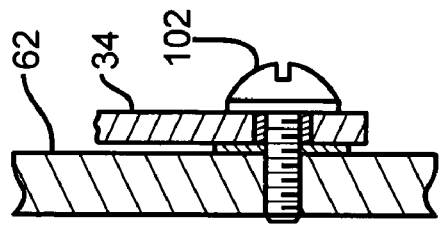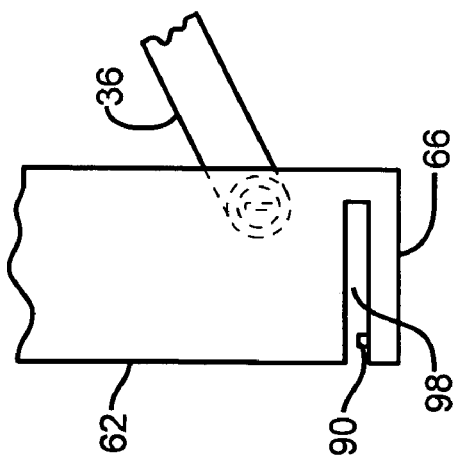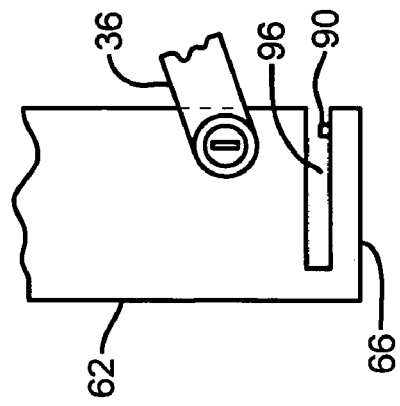

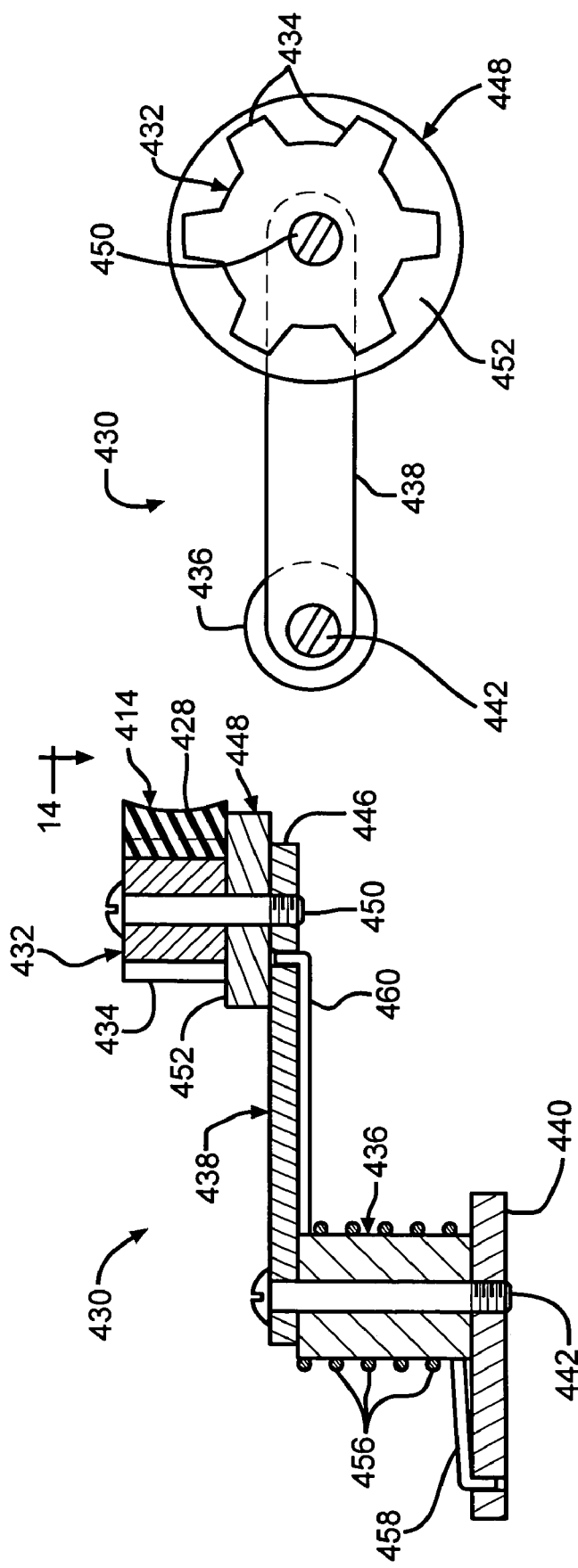

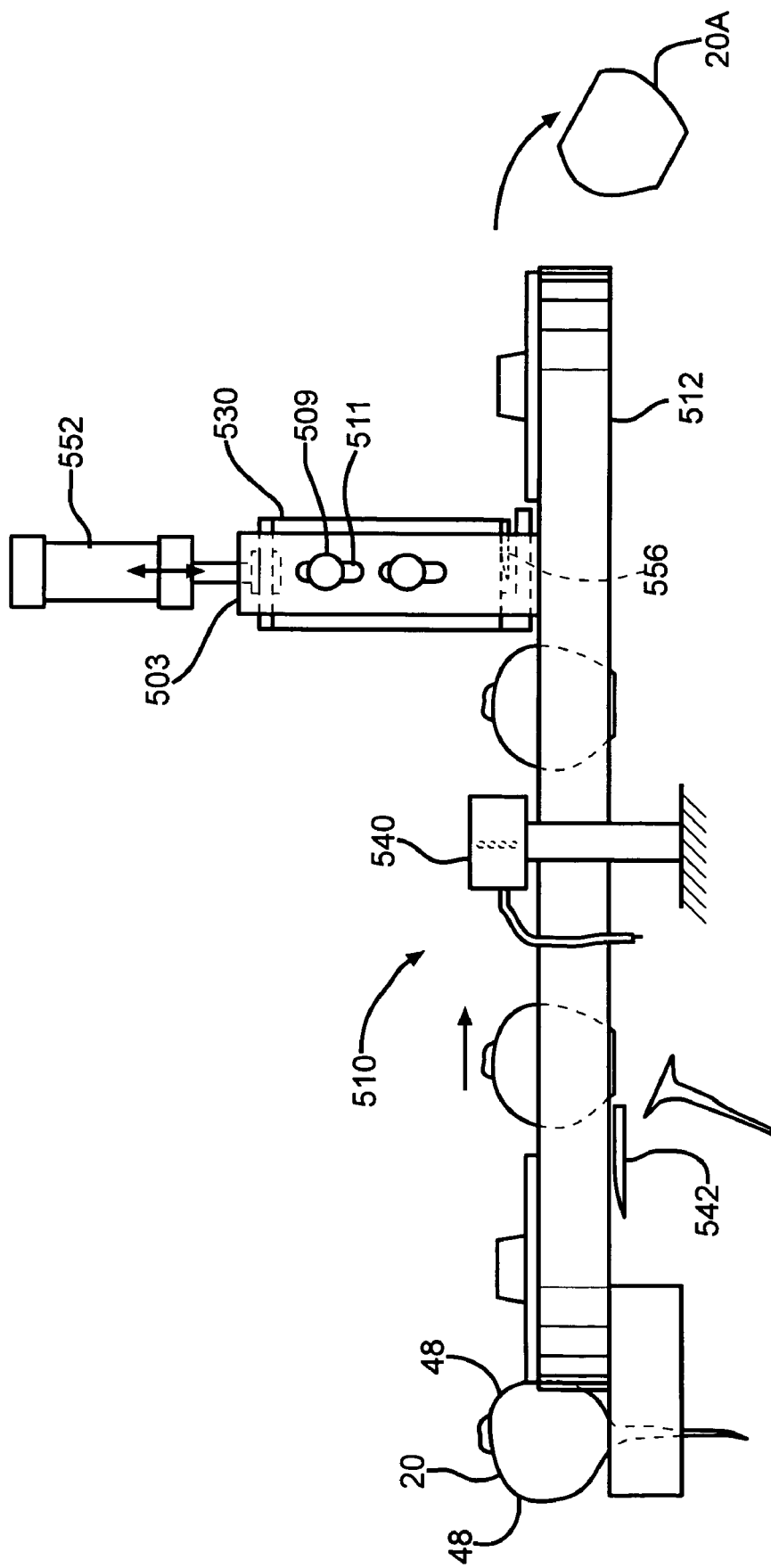

CROP PROCESSING MACHINE

TECHNICAL FIELD

This invention relates to apparatus for processing crops. More particularly, this invention pertains to equipment of the type suitable for trimming crops, such as root crops.

BACKGROUND OF THE INVENTION

Among the various crops grown for human consumption, an important group is the class of root crops. Root crops are grown for their edible roots or tubers. Some common root crops include aroids, beets, carrots, cassava, celery root, ginger, horseradish, jicana, parsnip, potato and sweet potato, radishes, rutabaga, salsify, turnips and yams. Some of these crops are traditionally eaten raw, and some are eaten after having been cooked. Some of these crops require cutting or trimming prior to packaging for shipment to food processors and distributors. Automated machines for slicing, cutting and trimming vegetables are known. For example, U.S. Pat. No. 3,734,004 to Losito discloses a mushroom trimming machine that transports mushrooms on a series of conveyors or belts. The mushrooms are carried past trimming knives to first trim the bottom or root end, and then slice off the mushroom top or button. Also known in the crop processing industry are machines capable of automatically feeding the crops into engagement with the crop trimming machines. U.S. Pat. No. 2,096,588 to King discloses a screw conveyor device capable of orienting root crops and delivering them to a crop processing station. A root processing machine is disclosed in U.S. Pat. No. 6,237,477 to Huddle. This machine uses a pair of opposed belts to carry root crops, such as radishes, past a first knife to trim the root from the radish, and then past a second knife to trim off the stem.

It would be advantageous if there could be developed an improved crop processing machine that was reliable for use over long operating periods, that was easy to maintain in a clean state, and was capable of high throughput.

SUMMARY OF THE INVENTION

The above objects as well as other objects not specifically enumerated are achieved by a crop processing machine that includes a transport mechanism for conveying a crop, a mounting assembly fixed with respect to the transport mechanism, and a knife assembly pivotally mounted with a 4-bar link to the mounting assembly, with the knife assembly including a knife for trimming the crop as the crop is conveyed past the knife assembly.

According to this invention there is also provided a crop processing machine having a transport mechanism for conveying a crop, the transport mechanism being adapted to convey the crop along a path that is substantially linear. The machine also includes a knife assembly mounted for movement through a range of motion with respect to the transport mechanism, the knife assembly including a knife for trimming the crop as the crop is transported past the knife assembly. The knife assembly is mounted in a configuration in which the knife is constrained to always be substantially parallel to the substantially linear path throughout the entire range of motion.

According to this invention there is also provided a crop processing machine having a transport mechanism for conveying a crop in a substantially horizontal direction, and an entrance guide for feeding the crop into the machine with a bottom end of the crop being positioned substantially at a predetermined vertical position with respect to the transport mechanism. A fixed knife is mounted in a fixed position with respect to the transport mechanism for trimming the bottom end of the crop, and a guide is provided for sensing a top end of the crop. Also provided is a moveable knife for trimming the top end of the crop as the crop is transported past the moveable knife, the knife being moveably mounted within a vertical range of motion with respect to the transport mechanism in response to the sensing of the top end of the crop by the guide.

According to this invention there is also provided a crop processing machine having a transport mechanism for conveying a crop in a substantially horizontal direction, the transport mechanism having a pair of opposed belts mounted for endless travel around rotating pulleys, the opposed belts being spaced apart horizontally and configured to convey the crop along a substantially linear path, and the belts having opposed outer surfaces that are concave to facilitate the grasping of the crop by the belts. A fixed knife is mounted in a fixed position with respect to the transport mechanism for trimming a bottom end of the crop. Also provided is a moveable knife for trimming a top end of the crop as the crop is transported past the moveable knife.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is schematic view in elevation of the knife assembly of the machine, taken along line 4-4 of FIG. 1.

FIG. 6 is a plan view of the guide adjusting plate of the knife assembly, taken along line 6-6 of FIG. 4.

FIG. 7 is an elevational view of a portion of the knife assembly, taken along line 7-7 of FIG. 4.

FIG. 8 is an elevational view of a portion of the knife assembly, taken along line 8-8 of FIG. 4.

FIG. 9 is a cross-sectional view of the connection of the mounting links to the knife assembly, taken along line 9-9 of FIG. 4.

FIG. 13 is a cross-sectional view in elevation of the idler mounting assembly of FIG. 12, taken along line 13-13.

FIG. 14 is a plan view of the idler mounting assembly of FIG. 13, taken along line 14-14 of FIG. 13.

FIG. 15 is a schematic view in elevation similar to FIG. 10, showing yet another embodiment of the invention.

DETAILED DESCRIPTION OF THE INVENTION

The description and drawings disclose the crop processing equipment of the invention using radishes as the exemplary crop being processed. It is to be understood that the processing apparatus of the invention can be used for other root crops and any other suitable crops.

Figure 1:
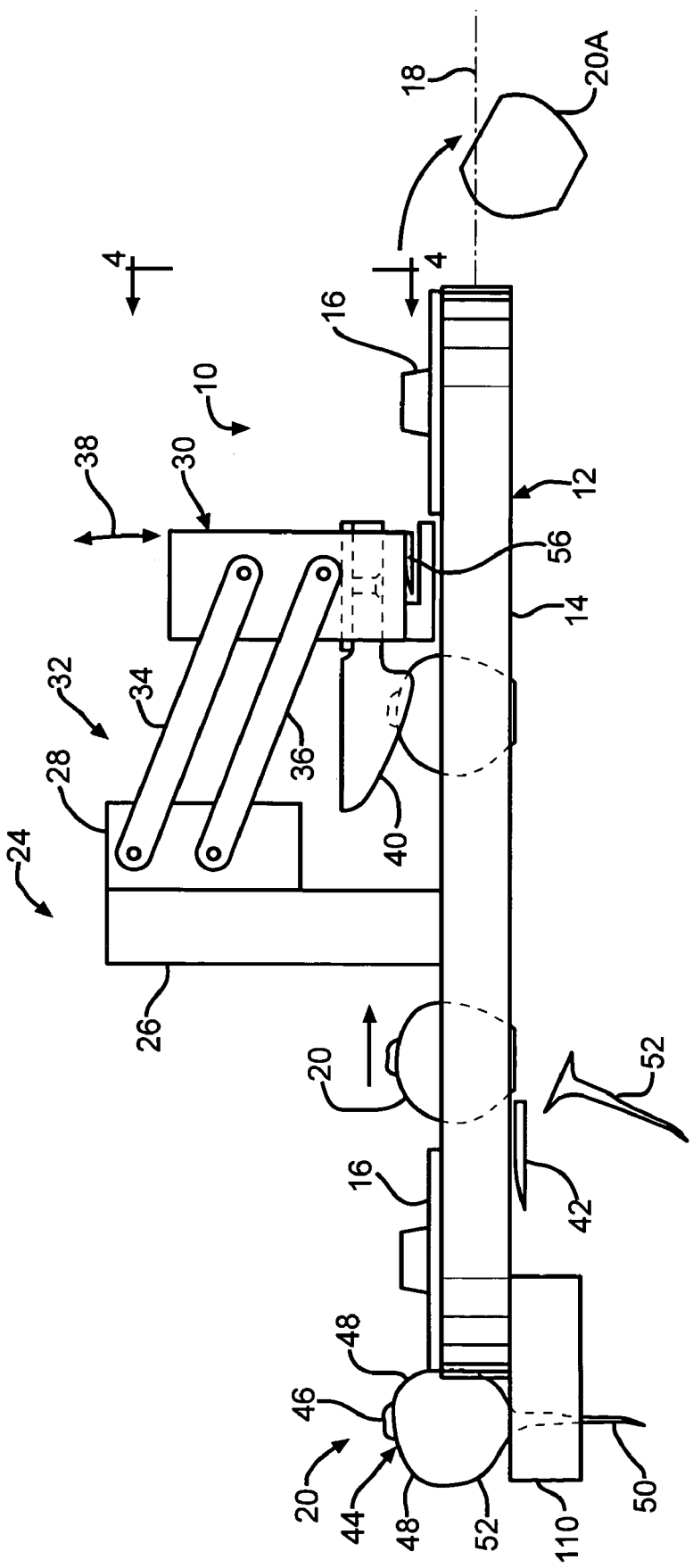
FIG. 1 is a schematic view in elevation of a crop processing machine.

As shown in FIG. 1, the crop processing machine is indicated generally at 10.

A belt conveyor 12 is comprised of a pair of opposed belts 14, only one of which is shown, mounted for endless travel around rotating pulleys 16. At least one of the pulleys is driven by a motor, not shown. The opposed belts 14 are slightly spaced apart horizontally, and the belts 14 cooperate to convey the crop through the machine 10 in a substantially linear path 18. Although the crop is shown as a radish 20, it is to be understood that the machine can be used for trimming and/or slicing numerous other crops. The machine is especially adapted for trimming root crops, such as radishes, turnips, parsnips and rutabagas. Although a belt conveyor 12 is shown, any transport mechanism, such as a forked or spiked chain or a dual screw conveyor, both not shown, can be used to convey the crop 20 through the machine 10.

A mounting assembly 24 is attached to the machine 10, in a fixed position with respect to the conveyor 12. The mounting assembly 24 includes a stationary post 26 and mounting bracket 28. Positioned downstream of the mounting assembly 24 is a moveable knife assembly 30. As shown in FIG. 1, the knife assembly 30 is pivotally mounted from the mounting bracket 28 with a 4-bar link assembly 32. It is to be understood that the knife assembly 30 can be mounted in other ways, as will be disclosed below. The 4-bar link 32 includes a pair of upper links 34 and a pair of lower links 36, all of which are hinged so that the knife assembly 30 can pivot with respect to the mounting assembly 24 while remaining substantially vertical throughout its range of motion, which is along an arc indicated by the arrow 38. The knife assembly 30 includes a guide member 40 configured to contact the radish as the radish is transported through the machine 10 and past the knife assembly 30. The guide member 40 is shown in more detail in FIGS. 2 and 3. As the radish is moved relative to the guide member 40, the knife assembly 30 will be moved along a portion of its range of motion to accommodate the contact between the guide member 40 and the radish.

The crop processing machine 10 includes a fixed knife 42 mounted in a fixed position with respect to the conveyor 12. The radishes include a top or stem end 44 having a stem 46 and a generally rounded upper surface or shoulders 48. The radishes also include a root 50 at the other or bottom end 52. In operation, as the radishes pass the fixed knife 42, the bottom end of the radish, including the root 50, is trimmed off. The knife assembly 30 also includes a moveable top trimming knife 56 mounted to trim off the top or stem end 44 of the radish as the radish is transported past the knife assembly 30. After being trimmed both at the bottom by the fixed knife 42 and at the top by the moveable knife 56, the trimmed radish 20A is released from the machine. The purpose of having the top trimming knife 56 be a moveable knife is that the radishes come in different sizes and shapes, and it is desirable to trim off only the amount of the top of the radish necessary, without wasting any of the radish content.

Figure 5:
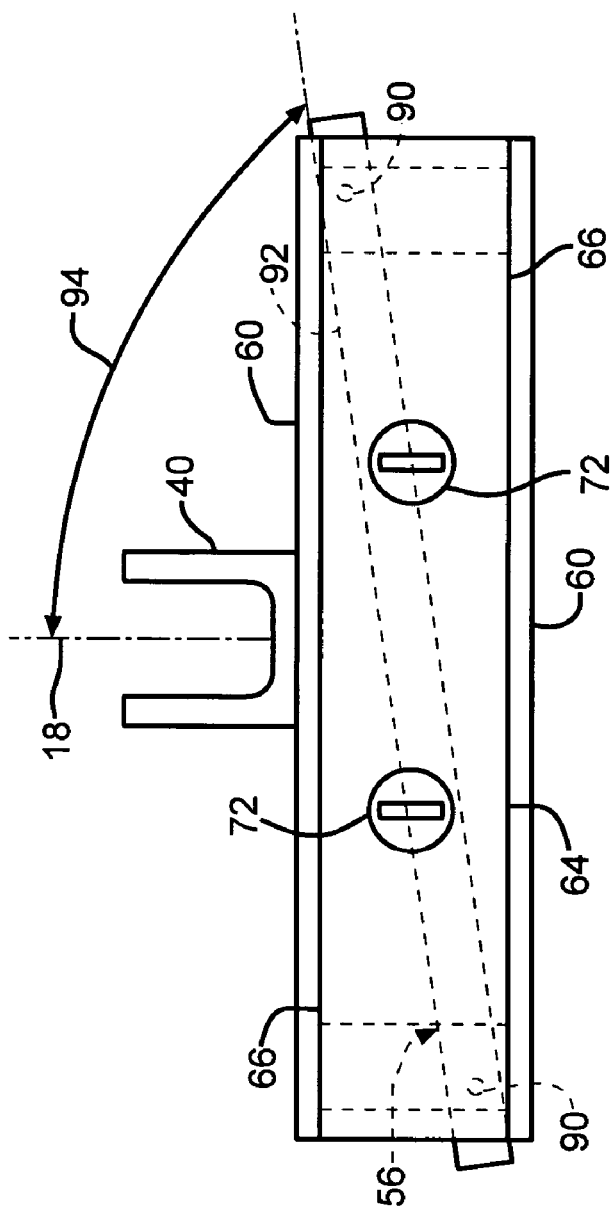
FIG. 5 is a plan view of the knife assembly of FIG. 4, taken along line 5-5 of FIG. 4.

As shown in FIGS. 4-6, the knife assembly 30 includes a frame 58 and a guide mounting plate 60. The frame 58 includes generally vertical side walls 62, a top wall 64 connecting the side walls 62, and left and right blade mounting flanges 66. The moveable or top trimming knife 56 is mounted on the blade mounting flanges 66. The guide mounting plate 60 has the guide member 40 attached to it. The guide mounting plate 60 is mounted for a vertical sliding movement with respect to the frame 58. Any suitable means for carrying out this vertical movement can be used. As shown in FIG. 6, the guide mounting plate 60 includes notches or keyways 70 that substantially conform to the cross-sectional shape of the vertical side walls 62 of the frame 58. The guide mounting plate 60 is vertically movable with respect to the frame 58 by means of threaded bolts 72 that extend through the top wall 64 of the frame and through threaded openings 74 in the guide mounting plate. By rotating the bolts 72, the guide mounting plate 60 is raised or lowered with respect to the frame 58. Locking nuts 76 can be tightened to lock the threaded bolts relative to the guide mounting plate 60. The mounting plate and frame can be made of any suitable materials, such as steel, aluminum or plastic materials. It can be seen that by rotating the bolts 72, the guide mounting plate 60, and hence the guide member 40, can be moved vertically with respect to the knife 56, thereby adjusting the predetermined position of the knife 56 with respect to the guide member 40 and the end of the crop.

Figure 2:
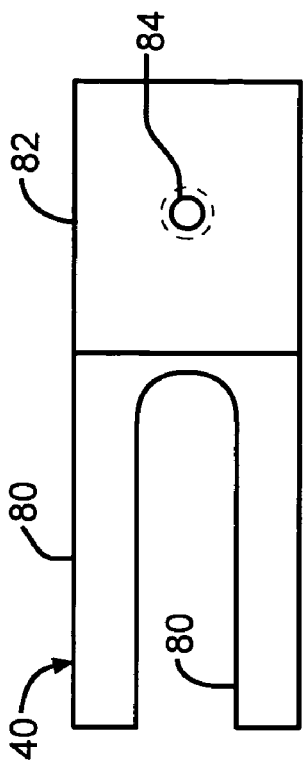
FIG. 2 is a schematic view in elevation of the guide member for contacting the crop being processed.
Figure 3:
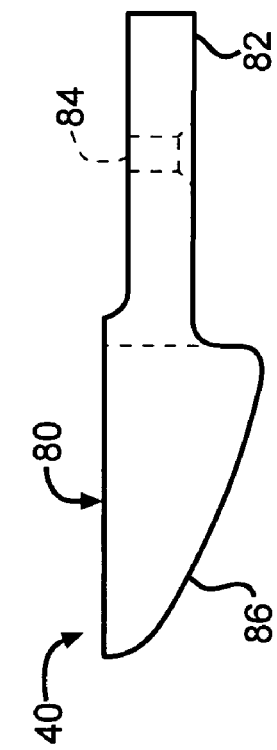
FIG. 3 is a schematic plan view of the guide member of FIG. 2.

As shown in FIGS. 2 and 3, the guide member 40 is comprised of guide runners 80 and a shank portion 82. The shank portion includes a screw hole 84 for attachment of the guide member to the mounting plate 60. The guide runners 80 have an inclined or angled surface 86 configured to contact the radish and to slide along the shoulders of the radish. The runners 80 are spaced apart a distance sufficient to accommodate the stem 46 of the radish, allowing the runners to contact and ride on the shoulders 48 of the radish without riding on the stem itself. The runners 80 and the shank portion 82 of the guide member 40 are preferably made of a low friction plastic material, such as an ultra high molecular weight nylon or polyester plastic material.

As shown in FIGS. 5, 7 and 8, the blade mounting flanges 66 include mounting pins 90 over which the knife blade 56 is placed to hold the knife blade firmly in place. In a substantially horizontal plane, the front edge 92 of the knife blade 56 is oriented at an acute angle to the substantially linear transport path 18, as indicated by the arcuate arrow 94. The orientation of the front edge 92 of the blade in this manner makes a smooth entry of the knife blade 56 into the radish, with less tearing or ripping of the radish. The angle 94 can be any suitable angle, and preferably within the range of from about 60 degrees to about 87 degrees. The connection between the mounting flanges 66 and the frame walls 62 include slots through which the knife 56 is extended. As shown in FIG. 7, the right hand frame wall 62 includes a forward oriented slot 96, and as shown in FIG. 8, the left hand frame wall 62 includes rearward oriented slot 98.

The connection between the links 34 and 36 of the 4-bar link 32 and the knife assembly 30 can be any suitable mechanism allowing the linkages to pivot. A preferred connection is shown in FIGS. 4 and 9, where the links 34 and 36 are connected to the knife assembly 30 with linkage blocks 100. The linkage blocks 100 can be connected to the walls 62 of the knife assembly frame 58 by any suitable manner, such as by welding. The links 34 and 36 are connected to the linkage blocks 100 by threaded bolts 102 that extend through the links 34 and 36 and into threaded bores in the linkage blocks 100. A metal spacer hub 104 is positioned between the links 34 and 36 and the linkage blocks 100. A nylon or other low friction material bushing 106 is positioned within the spacer hub 104 to reduce friction.

In operation, as a radish is conveyed through the machine 10 by the conveyor 12, the bottom 52 of the radish is trimmed off. The runners 80 of the guide member 40 intercept the top 44 of the radish and slide on the shoulders 48. The inclined surface 86 of the guide member 40 causes the entire knife assembly 30 to be raised up so that the movable knife blade 56 is positioned at a predetermined position with respect to the shoulders 48 of the radish, and the top 44 of the radish is sliced off at the desired location. When viewed from the side, i.e., as viewed in FIG. 1, the 4-bar link 32 maintains the knife assembly 30 in a constant orientation with respect to the machine 10 so that the knife blade 56 remains substantially parallel to the linear path 18 of the radish traveling through the machine 10, regardless of the position of the knife assembly 30 along the range of motion of the knife assembly 30. The range of motion of the knife assembly 30, represented by the arrow 38, is generally arcuate.

The guide member 40 is vertically adjustable with respect to the frame 58 of the knife assembly 30 so that the predetermined position of the knife 56 with respect to the radish can be modified. Although the guide member 40 is shown with two runners 80, the machine 10 could be provided with a single runner configured to contact and slide on the shoulder 48 of the radish. Further, the guide member could be provided with wheels, not shown, rather than runners 80 for contacting the radish. Also, other mechanisms for assessing the relative height of the radish, such as laser detection devices or light and photocell devices can be used with the machine 10.

Since the knife assembly is required to be raised up each time a radish passes the knife assembly 30, it is preferable that the knife assembly 30 be light weight to avoid excessive wear on the radishes and on the guide member 40. For this purpose it may be advantageous to use light weight materials in the knife assembly 30. Also, holes can be drilled in some of the elements of the knife assembly 30. Further, a spring could be used for balancing the rotation of the knife assembly 30 for easy rotation with the 4-bar link.

As the radish is introduced to the machine, the radish is preferably registered or fixed vertically with respect to the conveyor 12 by the use of an entrance guide means 110. In a preferred design, the entrance guide 110 comprises opposed low friction blocks that can be adjusted to set the desired input height of the radish relative to the conveyor 12 and hence the crop processing machine 10. Since the knife 42 is fixed with respect to the machine 10 and conveyor 12, the entrance guide sets or establishes how much of the bottom of the 52 of the radish will be sliced off.

Figure 10:
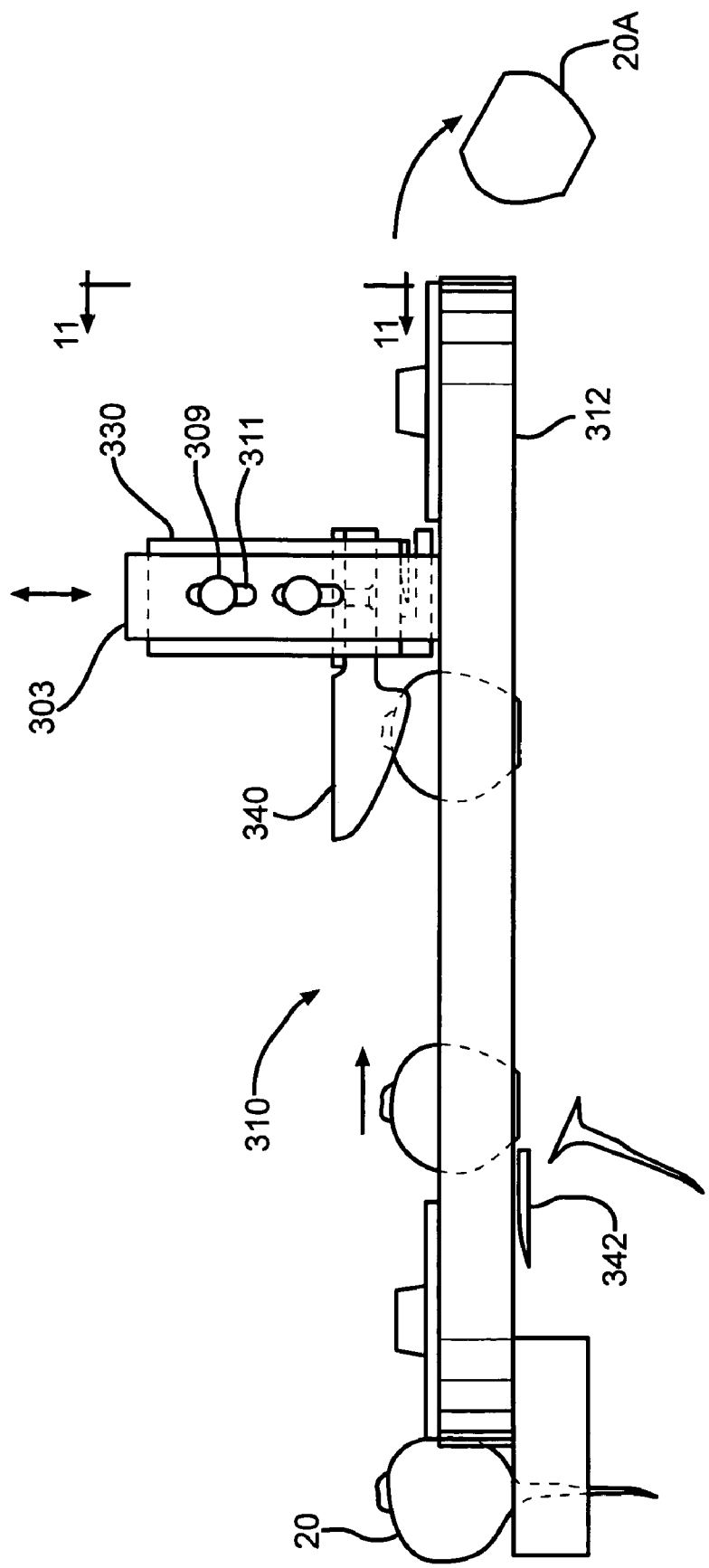
FIG. 10 is a schematic view in elevation similar to FIG. 1, showing a different embodiment of the invention.
Figure 11:
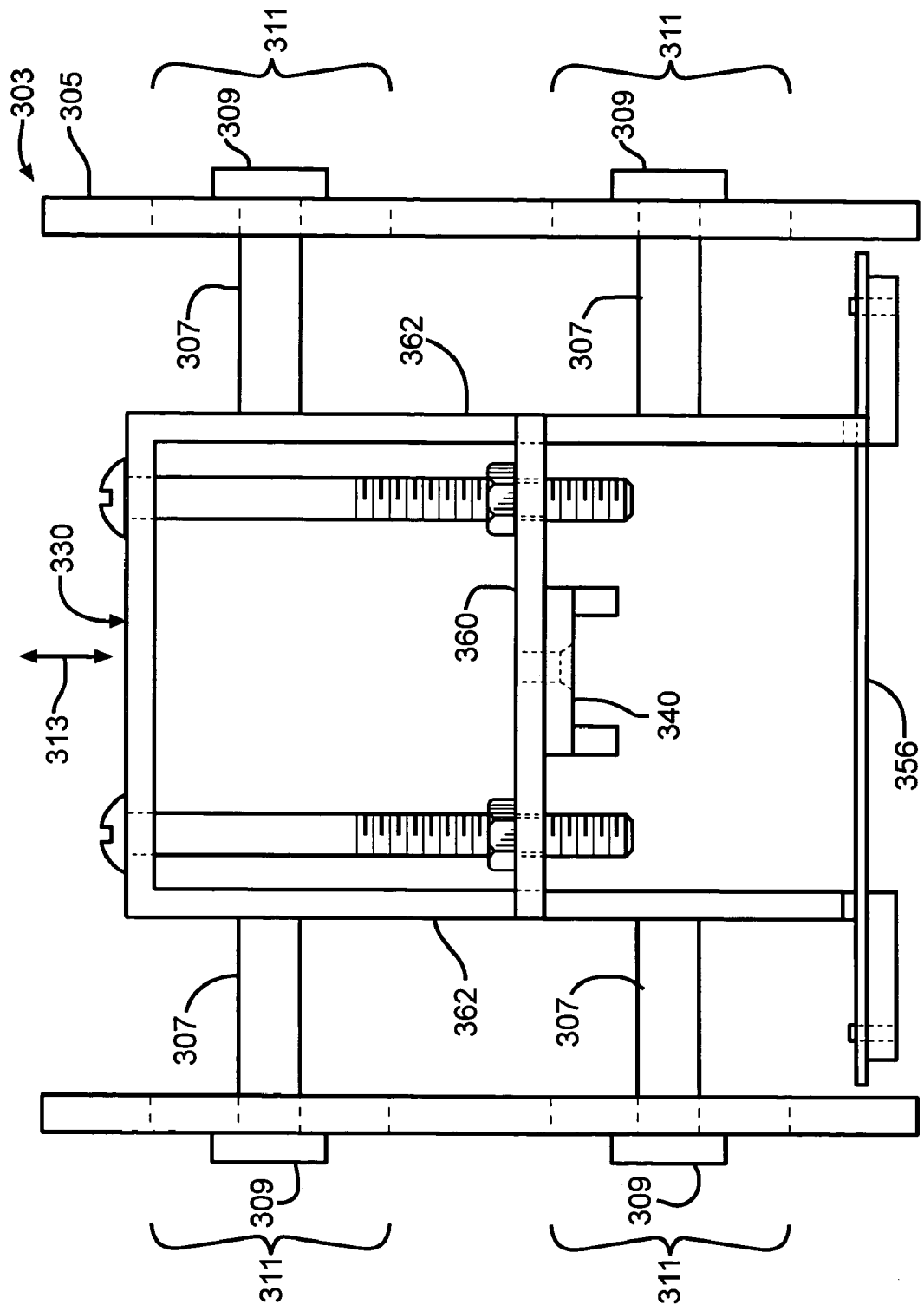
FIG. 11 is a view in elevation of the apparatus of FIG. 10, taken along line 11-11.

An alternate embodiment of the invention is illustrated in FIGS. 10 and 11. The crop processing machine of the alternate embodiment is indicated generally at 310. The stationary post 26 and 4-bar link assembly 32 of the first embodiment, shown in FIG. 1, are not present. Instead, the knife assembly 330 is mounted on a stationary support framework, indicated generally at 303, that is fixed with respect to the conveyor 312 and the machine 310. The framework 303 consists of a pair of stationary support walls 305. The knife assembly 330 is similar to the knife assembly 30 of the first embodiment, but includes arms 307 connected to the walls 362 of the knife assembly 330. The guide member 340 is adjustable with respect to the knife assembly 330 by movement of the guide mounting plate 360 with respect to the knife assembly 330.

At the outward ends of the arms 307, there is a head or cap 309. The stationary support walls 305 contain slots 311 to enable a vertical range of motion for the arms 307, and hence a vertical range of motion for the entire knife assembly 330. The vertical motion of the slidably mounted knife assembly 330 is indicated by arrow 313.

In operation, as a radish 20 is transported by the conveyor 312 through the machine 310, the bottom knife 342 trims the bottom of the radish. Next, the radish contacts the guide member 340, which raises the knife assembly 330 vertically to set the movable knife 356 at the proper height to trim the top of the radish. It can be seen that the moveable knife 356 will remain horizontal throughout its entire range of vertical motion as the arms 305 of the knife assembly 330 move up and down in the slots 311. The knife 356 will always be in a predetermined position with respect to the top of the radish for an optimum trimming of the radish.

It is to be understood that the radish processing machines 10 and 310 are to be made of materials, such as stainless steel, for example, and constructed structurally, in a manner suitable for easy and effective cleaning since the machines are designed for handling food products intended for human consumption.

Figure 12:
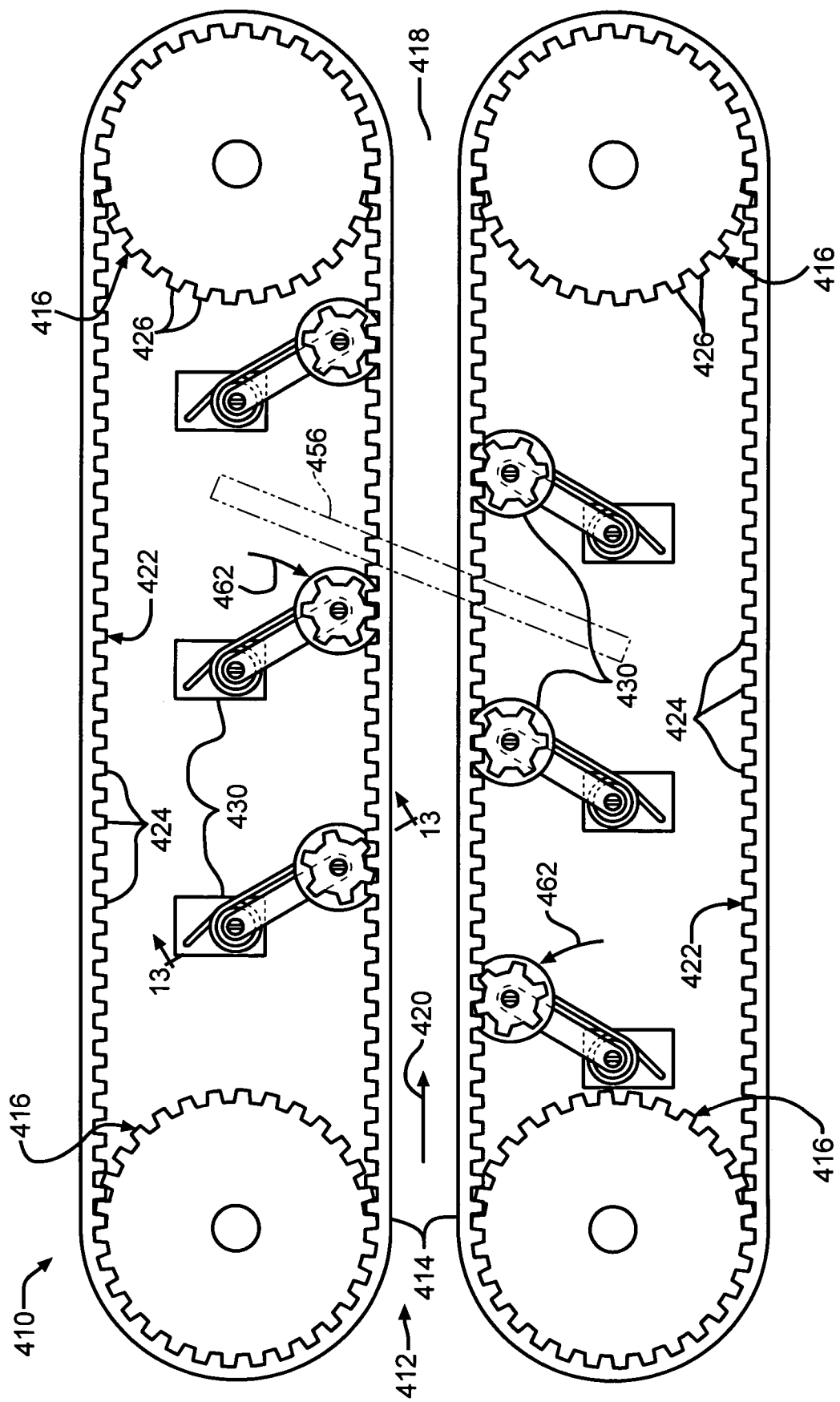
FIG. 12 is a plan view of a crop processing machine according to another embodiment of the invention.

As shown in FIG. 12, in an alternate embodiment of the invention, a crop processing machine indicated at 410 includes a belt conveyor 412 that is comprised of a pair of opposed belts 414. The belts 414 are mounted for endless travel around rotating pulleys 416. At least one of the pulleys for each belt is driven by a motor, not shown. The opposed belts 414 are slightly spaced apart horizontally, forming a gap 418. The belts 414 cooperate to convey the crop through the machine 410 in a substantially linear path, indicated at 420, through the gap 418. It can be seen that the inner surface 422 of the belts 414 is provided with splines or teeth 424 to mate with the grooves between the splines or teeth 426 of the rotating pulleys 416.

In order to maintain the belts 414 in a proper spaced apart condition as the radish or other crop passes along the gap 418, a series of idler wheel assemblies 430 is placed along each side of the gap 418 to support the belts 414. Preferably, the idler wheel assemblies 430 are staggered, as shown in FIG. 12. As shown in FIGS. 13 and 14, the idler wheel assemblies 430 include idler wheels 432 that preferably have splines or teeth 434 that correspond with the grooves between the teeth 424 of the belts 414. The idler wheel assemblies 430 include a spacer bushing 436 separating an idler arm 438 from a mounting frame member, indicated schematically at 440. The mounting frame member 440 can be any member associated with the crop processing machine 410 that is suitable for mounting the idler wheel assemblies 430. A fastener, such as shoulder bolt 442, can be used secure the idler arm 438 and the spacer bushing 436 to the mounting frame member 440. In this arrangement, the idler arm 438 is mounted for rotation about the shoulder bolt 442. At the distal end 446 of the idler arm 438 the idler wheel 432 and a belt support wheel 448 are mounted to the idler arm 438 with a shoulder bolt 450. Any suitable fastener can be used. It can be seen that when the idler wheel 432 is engaging the belt 414, the belt 414 can contact or rest on the top surface 452 of the belt support wheel 448.

A helical spring 456 is positioned about the spacer bushing 436. The spring has an anchor pin 458 attached to the mounting frame member 440 and an extension rod 460 attached to the idler arm 438. By this arrangement, the idler arm 438 is biased by the spring 456 so that the idler wheel 432 is always forced into contact with the belt 414, in the direction indicated by arrows 462 in FIG. 12. During operation, as the radishes are carried by the belts 414 through the crop processing machine 410, the spacing of the gap 418 will vary, being spread wide by relatively fat radishes, and also pinched to a thinner spacing by the spring-biased idler wheels 432 when a relatively thin radish is traveling through the machine. It is to be understood that other biasing mechanisms besides springs, such as tortionelastic joints, can be used to bias the idler wheels 432 toward the belts 414.

It is preferred to have the outer surface 428 of the belts 414 formed in a concave configuration to facilitate the grasping of the crops 20 by the belts 414, as shown in FIG. 13. The concave outer surface 428 can be formed in any suitable manner. For example, the concave outer surface 428 can be formed during molding of the belts 414. Also, the belts 414 can be molded or formed with a rectangular cross-section, and then the outer surface 428 can be carved out or routed to from the concave shape.

FIG. 15 illustrates a different embodiment of the invention. The crop processing machine 510 is substantially similar to that shown in FIG. 10, but instead of a guide for 340 for detecting the height of the radish, a radish sensor 540 is used to detect the height of the radish. The radish sensor 540 is positioned to be able to read or detect the shoulders 48 of the radish 40 as the radish approaches the support framework 503. The knife 556 is mounted in a knife assembly 530 that is movable vertically with respect to the support framework 503. A pneumatic actuator 552 is connected to the knife assembly 530 and is configured to raise the knife assembly 330 vertically to set the movable knife 556 at the proper height to trim the top of the radish 20. Actuator 552 moves in response to the detected top or shoulders 48 of the radish. The actuator 552 need not be pneumatic, but can be operated by any means suitable to move the knife assembly 530 and knife 556 vertically with respect to the radish.

The sensor 540 can be an optical sensor, and can have an associated controller, not shown, for timing the vertical movement of the knife assembly 530 to position the knife 556 properly with respect to the radish 20 by the time the radish reaches the knife 556. Preferably, the sensor 540 comprises an opposed transmitter and receiver, with the transmitter sending a signal transversely, across the path of travel of the radish in the crop processing machine 510, to the receiver positioned on the opposite side of the conveyor 512. The sensor 540 can be viewed as a guide for sensing a top end of the radish. It is to be understood that any other type of sensor can be used to detect the shoulders 48 or top portion of the radish for purposes of guiding the knife 556 to the proper height with respect to the radish 20. For example, mechanical or electronic sensors can also be used.

The principle and mode of operation of this invention have been described in its preferred embodiments. However, it should be noted that this invention may be practiced otherwise than as specifically illustrated and described without departing from its scope.

What is claimed is:

1. A crop processing machine comprising:
   a transport mechanism for conveying a crop along a path, at least part of which is substantially linear;
   a knife assembly adjacent the transport mechanism such that it is capable of cutting off a portion of a crop, the cut-off portion being determined by vertical movement of the knife assembly with respect to the transport mechanism, the vertical movement of the knife assembly being effectuated by horizontal movement of a crop and the size of a crop to be processed, the knife assembly including:
   a guide member attached to the knife assembly and having at least one runner configured to contact and ride over a crop on the transport mechanism such that the at least one runner causes the knife assembly and guide member to move vertically by horizontal movement of a crop under the guide member, the vertical movement distance determined by the size of a crop over which the at least one runner rides;
   a non-rotating substantially planar trimming knife, which is attached to, and which rises and falls with the knife assembly as the at least one runner rides over a crop to be processed, as the crop is transported past, the trimming knife having a cutting edge that is located below the at least one runner by an adjustable first cutting distance from the guide member that defines an amount of crop that is cut off the crop by the trimming knife;
   wherein the knife assembly, guide member and trimming knife are urged downwardly and toward a crop to be processed, by gravity, and the first cutting distance is adjustable by rotation of a threaded bolt.

2. The machine of claim 1 in which the trimming knife is mounted in a knife assembly pivotally mounted to a mounting assembly by a 4-bar link.

3. The machine of claim 1 wherein the guide member is comprised of first and second runners, parallel and spaced apart from each other, each of the runners having a curved edge, which is sized, shaped and arranged to allow the runners to ride over a crop to be processed.

4. The machine of claim 1 wherein the guide member is comprised of first and second runners, parallel and spaced apart from each other, each of the runners having an inclined edge, which is sized, shaped and arranged to allow the runners to ride over a crop to be processed.

5. The machine of claim 1 in which the at least one runner is formed of at least one of: nylon and polyester plastic.

6. The machine of claim 3 which the guide member is vertically adjustable with respect to the knife assembly to modify the predetermined position of the top trimming knife with respect to the crop.

7. The machine of claim 1 in which the cutting edge of the trimming knife is substantially straight and the trimming knife cutting edge and the direction of movement of the crop into the cutting edge form an angle between them that is between about 60 degrees and about 87 degrees.

8. The machine of claim 7, wherein said guide member is comprised of at least one wheel, which is configured to contact the crop being transported past the knife assembly and to move the knife assembly to a position relative to the crop so that the top trimming knife is in a predetermined position with respect to the crop.

9. The machine of claim 7 in which the location of the guide member is vertically adjustable with respect to top trimming knife to vary the location of the top trimming knife with respect to the crop.

10. The machine of claim 1 in which the transport mechanism is adapted to convey the crop along a path that is substantially linear, and a front edge of the top trimming knife is oriented at an acute angle to the path.

11. A crop processing machine comprising:
    a transport mechanism for conveying a crop in a substantially horizontal direction, wherein the transport mechanism having a pair of opposed belts mounted for endless travel around rotating pulleys;
    a fixed trimming knife mounted at a fixed position with respect to the transport mechanism, the fixed trimming knife for trimming the bottom end of the crop;
    a guide member for sensing a top end of the crop and for adjusting the elevation of a non-rotating top trimming knife that trims off the top end of the crop as the crop is transported past the top trimming knife, the guide member riding upwardly and over the top of a crop to be trimmed and thereby moving the top trimming knife to an elevation whereat the top trimming knife will cut off a portion of a crop, the guide member and top trimming knife being directed downwardly toward a crop by only gravity and being lifted vertically by horizontal movement of the crop under the guide member, the top trimming knife being located below the guide member by a first adjustable distance, the first adjustable distance defining an amount of the top end of the crop that is cut off by the top trimming knife wherein the first cutting distance is adjustable by rotation of a threaded bolt.

12. The machine of claim 11 wherein the guide member is configured to contact the crop being transported past the knife assembly and to move the knife assembly within the range of motion to a position relative to the crop so that the top trimming knife is in a predetermined position with respect to the crop.

13. The machine of claim 12 in which the guide member includes at least one runner configured to contact the crop.

14. The machine of claim 12 in which the guide member includes two runners configured to contact and slide on shoulders of an end of the crop, and wherein the guide member is configured to position the top trimming knife so that it is in a predetermined position with respect to the end of the crop.

15. The machine of claim 14 in which the runners include an inclined surface configured to contact and slide on the end of the crop.

16. The machine of claim 12 in which the guide member is vertically adjustable with respect to the knife assembly to modify the predetermined position of the top trimming knife with respect to the crop.

17. The machine of claim 12 in which a front edge of the top trimming knife is oriented at an acute angle to the path.

18. A crop processing machine comprising:
a transport mechanism for conveying a crop in a substantially horizontal direction, wherein the transport mechanism having a pair of opposed belts mounted for endless travel around rotating pulleys, the opposed belts being spaced apart horizontally and configured to convey the crop along a substantially linear path, the belts having opposed outer surfaces that are concave to facilitate the grasping of the crop by the belts;
a series of idler wheel assemblies placed along each side of a gap between the pair of opposing belts;
an entrance guide for feeding the crop into the machine with a bottom end of the crop being positioned substantially at a predetermined vertical position with respect to the transport mechanism;
a fixed knife mounted in a fixed position with respect to the transport mechanism for trimming the bottom end of the crop;
a guide member for sensing a top end of the crop; and
a trimming knife for trimming the top end of the crop as the crop is transported past the top trimming knife, the top trimming knife being moveably mounted within a vertical range of motion with respect to the transport mechanism in response to the sensing of the top end of the crop by the guide member; and
wherein the each idler wheel assemblies includes
an idler wheel having a plurality of splines corresponding to grooves between teeth of the belts;
an idler arm attached to the idler wheel;
a spacer bushing attached to the idler arm;
a shoulder bolt attached to the idler arm and the spacer wherein the shoulder bolt is attached to a mounting frame member; and
a helical coil spring attached to the mounting frame member and attached to the idler arm.

19. The machine of claim 18 wherein each helical coil spring having a anchor pin attached to the mounting frame member and having an extension rod attached to the idler arm.

\* \* \* \* \*